US012785400B2

(12) United States Patent
Stewart et al.

(10) Patent No.: US 12,785,400 B2
(45) Date of Patent: Nov. 3, 2026

(54) SYSTEM AND METHOD FOR MANAGING AN ELECTRICAL POWER NETWORK

(71) Applicant: Vistra Zero LLC, Irving, TX (US)

(72) Inventors: Bryan Stewart, Irving, TX (US); Jarrod Maddox, Irving, TX (US); Gene Luster, Irving, TX (US); Jeff Longshore, Irving, TX (US)

(73) Assignee: Vistra Zero LLC, Irving, TX (US)

( * ) Notice: Subject to any disclaimer, the term of this patent is extended or adjusted under 35 U.S.C. 154(b) by 318 days.

(21) Appl. No.: 18/732,606

(22) Filed: Jun. 3, 2024

(65) Prior Publication Data

US 2025/0030246 A1 Jan. 23, 2025

Related U.S. Application Data

(60) Provisional application No. 63/505,706, filed on Jun. 1, 2023.

(51) Int. Cl.
*H02J 3/32* (2006.01)
*H02J 3/007* (2026.01)
(Continued)

(52) U.S. Cl.
CPC .............. *H02J 3/322* (2020.01); *H02J 3/007* (2020.01); *H02J 3/381* (2013.01);
(Continued)

(58) Field of Classification Search
USPC .......................................................... 700/286
See application file for complete search history.

(56) References Cited

U.S. PATENT DOCUMENTS

2007/0021874 A1* 1/2007 Rognli ............... G06Q 30/0207 705/14.1
2008/0177678 A1* 7/2008 Di Martini ............. G06Q 10/06 705/412
(Continued)

FOREIGN PATENT DOCUMENTS

CN 108539750 A * 9/2018
DE 102018118895 A1 * 2/2020
(Continued)

OTHER PUBLICATIONS

M. C. Falvo, G. Graditi and p. Siano, "Electric Vehicles integration in demand response programs," 2014 International Symposium on Power Electronics, Electrical Drives, Automation and Motion, Ischia, Italy, 2014, pp. 548-553 (Year: 2014).*

*Primary Examiner* — Hien D Khuu
(74) *Attorney, Agent, or Firm* — Foley & Lardner LLP

(57) ABSTRACT

Systems and method for reducing load from a power grid by offloading residences that have energy storage appliances (e.g., rechargeable vehicle or wall batteries), may be utilized by an electric power provider to help increase available electrical power on a power grid so as to reduce pricing for electrical power. The power provider may have customers (i) who opt-into authorizing the power provider to offload the customers' residences when the appliances are available to supply power to electric power networks of respective residences (e.g., when an EV is plugged into a power station), and (ii) who do not opt-in. If sufficient amount of power cannot be offloaded from the opt-in customers, messages with offers to the non-opt-in customers may be send to identify additional energy resources. The power provider may send commands to cause the appliances to offload the residences. Moreover, a price optimization engine may be used for energy market pricing.

20 Claims, 8 Drawing Sheets

(51) Int. Cl.

| | |
|---|---|
| ***H02J 3/38*** | (2006.01) |
| *H02J 101/24* | (2026.01) |
| *H02J 101/28* | (2026.01) |
| *H02J 103/35* | (2026.01) |

(52) U.S. Cl.

CPC ....... *H02J 2101/24* (2026.01); *H02J 2101/28* (2026.01); *H02J 2103/35* (2026.01)

(56) References Cited

U.S. PATENT DOCUMENTS

| | | | | |
|---|---|---|---|---|
| 2015/0149256 | A1* | 5/2015 | Forbes, Jr. | B60L 53/305 |
| 2016/0329710 | A1* | 11/2016 | Clifton | G05F 1/66 |
| 2018/0334051 | A1* | 11/2018 | Samojeden | B60L 53/14 |
| 2022/0200278 | A1* | 6/2022 | Subbloie | G05B 13/0265 |
| 2024/0235202 | A1* | 7/2024 | Griffith | H01M 10/4207 |

FOREIGN PATENT DOCUMENTS

| | | | | |
|---|---|---|---|---|
| KR | 20220015723 | A | * | 2/2002 |
| WO | WO_2006096854 | A2 | * | 9/2006 |

* cited by examiner

100

SYSTEM AND METHOD FOR MANAGING AN ELECTRICAL POWER NETWORK

RELATED APPLICATIONS

This application claims priority to U.S. Provisional Patent Application having Ser. No. 63/505,706 filed on Jun. 1, 2023; the contents of which are incorporated by reference in their entirety.

BACKGROUND

Electrical power grids or power grids include electrical power plants and other forms of electrical power generation sources, transmission lines, and distribution centers. The power grids supply or distribute electric power to homes and businesses have become quite complex to manage due to (i) an expansion in the types of electricity power generation and (ii) increased loads on the power grids. Energy markets that price electric power being supplied to the power grids have also become more complicated due to larger and more dynamic demand from consumers of the electrical power on the power grids. The U.S. includes three primary power grids, including the Eastern Interconnection (east of the Rocky Mountains), Western Interconnection (west of the Rocky Mountain states), and Texas Interconnected system (limited to Texas).

Historically, electrical power has been primarily generated by traditional energy sources, such as fossil fuels (e.g., coal, oil, and natural gas) and nuclear power. However, with the advancement of "green" or renewable energy sources, such as wind and solar, the power grid and pricing models for the electrical power being produced and supplied to the power grid have had to adapt to the inclusion of renewable energy sources while simultaneously having to address a reduction in traditional energy sources (e.g., fossil fuels and nuclear power). As understood, despite the renewable energy sources being more eco-friendly, the renewable energy sources are generally less reliable than traditional energy sources due to being reliant on intermittent "fuel" sources (e.g., wind and sun) and more heavily inverter-based that reduces inertia on the power grid. This creates two major problems for the electrical grid in that on-demand power generation is more limited and power quality is degrading. A grid operator cannot call on renewables to be available at a specific time and, to date the electrical power cannot be adequately stored in sufficient volume for delivery at later times. For example, when a solar farm is in a cloudy location and during the evening when the sun is down, little or no electrical power is generated. Similarly, if wind is not blowing sufficiently at a wind farm, little or no electrical power is generated. Additionally, traditional energy sources use mechanical inertia to help stabilize frequency and voltage within the grid. With more inverter-based resources providing power, frequency and voltage deviation is increasing, thereby increasing the need to manage the grid's power quality on a greater frequency. When the renewable energy sources are insufficiently generating electric power or not balancing the frequency on the grid, the grid operator must find additional resources to either add additional power capacity or reduce demand to stabilize the power grid. In competitive markets, this will increase the system costs and potentially lead to the electrical power and the electrical energy provider (e.g., power grid operator) losing money or the grid operator having to call for emergency curtailment.

On the consumption side, with the expansion of a wide range of consumer and commercial electronics, such as televisions, home computers, mobile devices (e.g., mobile phones, tablets, etc.), home appliances (e.g., refrigerators, freezers, air conditioners, etc.), and electric vehicles, just to name a few, the demand on the power grid has greatly increased over the past couple of decades especially given population growth. One phenomenon that has occurred in recent years is the demand for electrical power during non-peak energy demand hours, such as overnight. Such non-peak demand increase is directly attributable to charging electric vehicle batteries overnight. Electric vehicle batteries, typically lithium ion batteries, large amounts of power for long periods of time. Nighttime is when solar power is generally unavailable because the sun is down and wind is often at low levels.

In general, growth of renewable energy sources and reduction of traditional energy sources in supplying electrical power to the power grids has resulted in less predictability of electrical power on the power grid. Such reduction of predictability has further resulted in reduced stability of the power grid, thereby resulting in increased challenges in managing the power grid and energy production.

As an example of impact in managing the power grid, power grid operators are often limited in pricing as a result of fixed-price contracts with customers. If the price to purchase and distribute the electrical energy over the power grid increases above the fixed price to the customers, then the grid operator or electrical energy provider loses money. In the event that there is insufficient energy production, expensive spot trades often occur due to an imbalance of supply and demand (i.e., more demand than supply), which causes the grid operator from to lose money. In some cases, if the imbalance becomes too great or if electrical energy production resources become unavailable, brownouts or blackouts may occur, which further causes instability of the power grid and energy trading market. Hence, there is a need to enable power grid operators to be able to price available electrical energy on the power grid, and thus stabilize electrical energy supply pricing so as to supply electrical power to customers at a profit while maintaining a stable power grid.

BRIEF SUMMARY

To assist energy producers in stabilizing and lowering prices of electrical power during peak demands or a limited supply of electrical power generation due to shortages of electrical energy supplies and/or production ability, electrical energy storage appliances, such as rechargeable batteries, including batteries of electric vehicles, or other electrical power storage appliances that are electrically connectable to electrical power networks of residences of customers of an electrical power provider may be used to offload the residences from the electrical power grid. Reduction of load from the electrical power grid by offloading residences may result in lowering electrical power demand from the electrical power grid, thereby reducing price of the electrical power and production thereof.

In offloading the residences from the electrical power grid, the electrical power provider may (i) monitor whether the energy storage appliances are available to supply electrical power to the electrical power networks of the residences of the customers (or commercial properties) and (ii) communicate instructions to cause the respective energy storage appliances to be electrically connected to the electrical power networks of the residences, thereby offloading those residences in whole or in part from the electrical power grid. The energy storage appliances may be of any type, including chemical-based energy storage appliances (e.g., rechargeable batteries), mechanical-based energy storage appliances (e.g., flywheels), or other energy storage device that can output electrical power.

Because a first portion of customers may be willing to opt into authorizing the electrical power provided to electrically connect the appliances to the electrical power network of the respective residences and a second portion of customers may not opt into authorizing energy storage appliances to be electrically connected to the electrical power networks of the respective residences, depending on the electrical power supply shortfall, more offloading of electrical power from residences than available from the first portion of customers may be warranted. In such a situation, communications to at least a portion of the second portion of customers (i.e., those who did not opt in) may be sent to request authorization to offload electrical power from the residences of the second portion of customers who temporarily opt into authorizing the electrical power provider to offload the electrical power network of the respective residences.

In an embodiment, the communication to the second portion of customers may include an offer of compensation to be awarded to the customers who opt into authorizing the electrical power provider to offload the residences of the second customers. For example, the compensation may be monetary, either in the form of direct payment or credit towards future electricity usage, and the communication may provide user-interactive buttons to enable the user to opt in or not opt in to authorizing the offloading of the electrical energy of the residence. By enabling the second portion of customers to offload their residences from the power grid by utilizing energy storage appliances connected to the electrical power networks of the residences, the electrical power provider may be better able to satisfy electricity demands from the power grid utilizing available electrical power currently that may be supplied by the energy storage appliances at the residences of the customers so that additional electrical power need not be produced and electricity prices of electrical power generation and supply thereof may be lowered.

One embodiment of a system for managing an electric power grid may include a non-transitory memory configured to store: (i) a first list of first customers and respective energy storage appliances configured to store energy to produce electrical power to be delivered to respective electrical power networks of residences of the first customers when electrically connected thereto, the first customers opting in to authorize an electric power provider to establish an electrical connection of the respective energy storage appliances to the respective electrical power network of the residences of the first customers in response to a command by the electric power provider; (ii) a second list of second customers and respective energy storage appliances configured to store energy to produce electrical power to be delivered to respective electrical power networks of residences of the second customers when electrically connected thereto, the second customers not opting into authorizing an electric power provider to establish an electrical connection of the respective energy storage appliances to the respective electrical power networks of the residences of the second customers in response to a command by the electrical power provider for the residences of the second customers, the second list further including network addresses of communications devices of the respective second customers. At least one processor may be in communication with the non-transitory memory, and be configured to monitor connection and charge status of energy storage appliances of the first and second customers. An amount of electrical power to be offloaded from the grid to reduce energy load by a desired amount may be determined. In response to determining the amount of electrical power to offload from the grid, a determination of a set of energy storage appliances that are (i) currently connected to the electrical power networks of respective residences of the first customers and (ii) charged sufficiently to offload the respective residences from the grid may be made. Determining that the energy storage appliances are charged sufficiently to offload a residence may include determining that the energy storage appliances are above a threshold charge (e.g., over 50% charged, enough charge to power a residence for at least 1 hour optionally based on current or historical power consumption, or otherwise). A determination as to whether the set of energy storage appliances is sufficient to reduce the energy load from the grid by the desired amount may be performed. In response to determining that the set of energy storage appliances is insufficient to reduce the energy load from the grid by the desired amount, requests may be communicated to the network addresses of communications devices of the second customers to request authorization to offload the respective residences by using energy storage appliances connected thereto to power the residences. In response to receiving authorization from the second customers, at least a portion of the energy storage appliances of the first and second customers may be commanded to supply electrical power to the respective residences of the first and second customers, thereby reducing the energy load on the electrical grid by the desired amount. In commanding the at least a portion of the energy storage appliances, commands may be sent to chargers to which the respective energy storage appliances are connected so as to reverse the chargers from charging the energy storage appliances to sourcing electric power from the energy storage appliances.

One embodiment of a method for managing an electric power grid may include storing (i) a first list of first customers and respective energy storage appliances configured to store energy to produce electrical power to be delivered to respective electrical power networks of residences of the first customers when electrically connected thereto, the first customers opting in to authorize an electric power provider to establish an electrical connection of the respective energy storage appliances to the respective electrical power network of the residences of the first customers in response to a command by the electric power provider; and (ii) a second list of second customers and respective energy storage appliances configured to store energy to produce electrical power to be delivered to respective electrical power networks of residences of the second customers when electrically connected thereto, the second customers not opting into authorizing an electric power provider to establish an electrical connection of the respective energy storage appliances to the respective electrical power networks of the residences of the second customers in response to a command by the electrical power provider for the residences of the second customers, the second list further including network addresses of communications devices of the respective second customers. Connection and charge status of energy storage appliances of the first and second customers may be monitored. An amount of electrical power to be offloaded from the grid to reduce energy load by a desired amount may be determined. In response to determining the amount of electrical power to offload from the grid, a determination of a set of energy storage appliances that are (i) currently connected to the electrical power networks of respective residences of the first customers and (ii) charged sufficiently to offload the respective residences from the grid may be made. A determination as to whether the set of energy storage appliances is sufficient to reduce the energy load from the grid by the desired amount may be determined. In response to determining that the set of energy storage appliances is insufficient to reduce the energy load from the grid by the desired amount, requests may be communicated to the network addresses of communications devices of the second customers to request authorization to offload the respective residences by using energy storage appliances connected thereto to power the residences. In response to receiving authorization from the second customers, commands to at least a portion of the energy storage appliances of the first and second customers may be made to supply electrical power to the respective residences of the first and second customers, thereby reducing the energy load on the electrical grid by the desired amount.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Managing an electric power grid has increased in challenged due to new forms of renewable energy being used to supply electric power on the power grid and increased demand due to increased numbers and types of electrical devices used by consumers and businesses. Moreover, traditional sources of electrical power, such as fossil fuels and nuclear power, that are abundant in availability and reliable, have become less favorable due to a variety of pollutant and political reasons. As such, power grid operators have had to rely more on renewable energy to make up for base load energy producers that are typically in the form of fossil fuels and nuclear power. As a result, pricing of electrical power generation has become more challenging such that accessing available electrical power storage appliances that are owned by customers of the electrical power provider may enable the provider to selectably offload residences from the power grid, thereby reducing demand from electrical power producers, and, in turn, reducing prices of the electrical power on the power grid.

Figure 1:
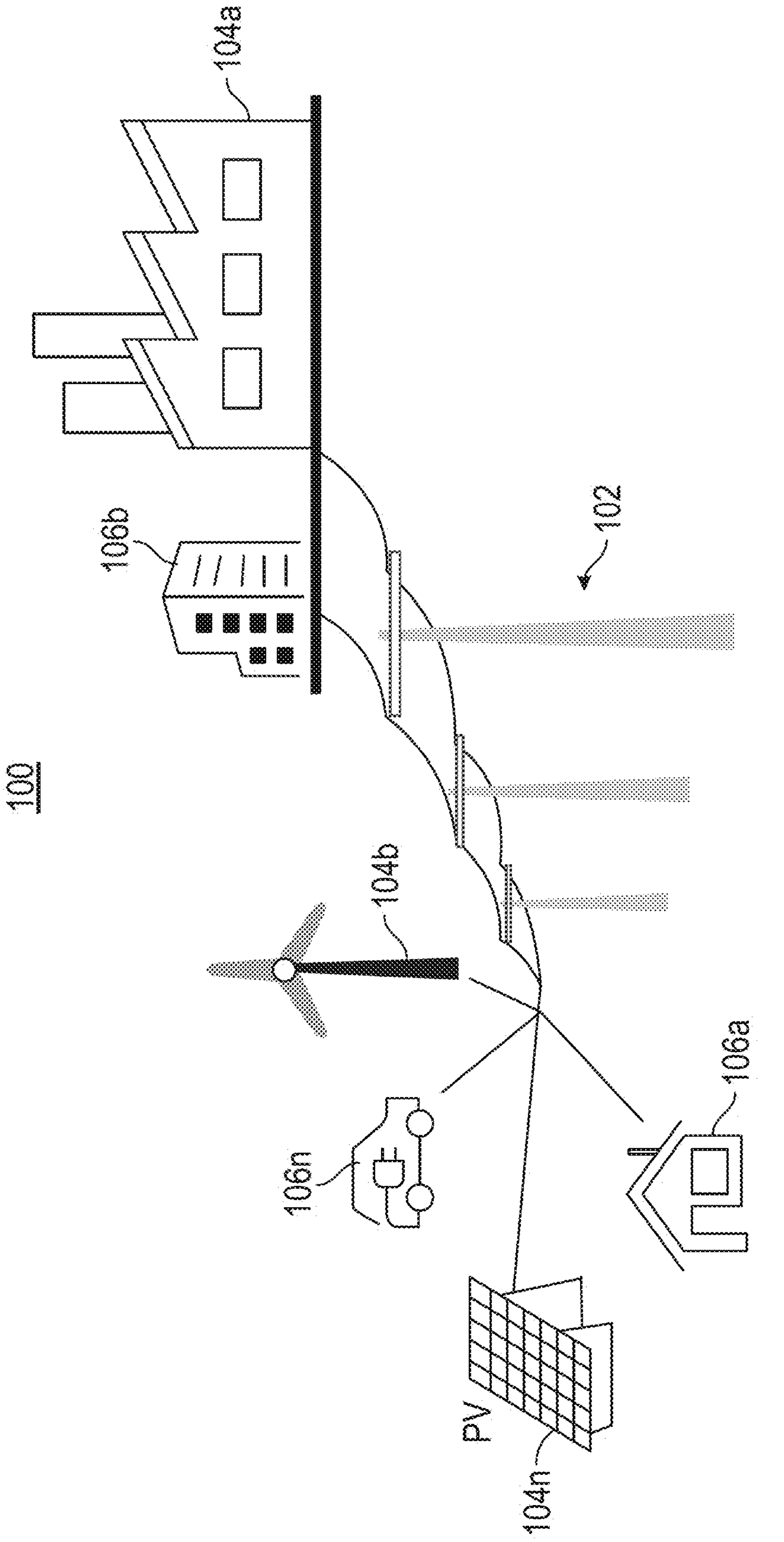
FIG. 1 is an image of an illustrative electrical power grid configured to receive electrical power from electrical power producers and convey the electrical power to customers, such as residences and businesses.

With regard to FIG. 1, an image of an illustrative electrical power grid 100 configured to receive electrical power from electrical power producers and convey the electrical power to customers, such as residences and businesses, is shown. The power grid 100 may include electric power transmission lines 102, traditional electric power plants 104*a* and renewable electric power generation systems, such as wind turbines 104*b* and solar panels 104*n* (collectively 104) typically organized on solar farms, and electrical power distribution centers (not shown). It should be understood that additional and/or alternative renewable or "green" electric power generators, such as geothermal generators, hydroelectrical, ocean wave energy generators, and so on may be configured to supply electric power to the transmission lines. The electric power supplied to the power grid 100 may be distributed to loads on the power grid 100. The loads may be owned or occupied by customers and include residences 106*a*, businesses 106*b*, and electric vehicles 106*n* (collectively 106), just to name a few.

As with any commodity market, when there is high electrical power demand, shortages of (i) electrical power generation resources, (ii) increased cost of fuel or other commodities that are used in generating electricity, (iii) increased labor cost, and (iv) many other energy source factors may cause a rise in electric power to be distributed to the loads. In such imbalanced supply/demand situations, the electric power provider seeks to find ways to reduce the cost of supplying electricity to the customers 106, thereby enabling the electric power provider to maintain a profit. Because customers of the electric power provider often have fixed price contracts, typically on a per kilowatt hour basis for a certain period of time, typically ranging from six month to two years, when the cost of electricity supplied to the electric power provider increases, profits for supplying the electricity to the customers drop or may even result in a loss if the cost of electricity from the electrical power producers increases above the cost of the fixed price contracts.

For the purposes of this disclosure, the following definitions are used. Electricity, electrical power, and electric power are interchangeable. Electrical power producers are organizations that produce electricity using traditional or renewable energy resources and equipment. An electric power grid operator is an organization that operates and often maintains the electric power grid in whole or in part. An electric power provider is an organization that has end-customers to which electrical power is delivered via the electric power grid 100. For simplicity, the term organization is meant to include one or more organizations that collectively operate to perform the various functions of producing or generating electric power, maintaining the power grid 100, and supplying electric power to customers.

Figure 2B:
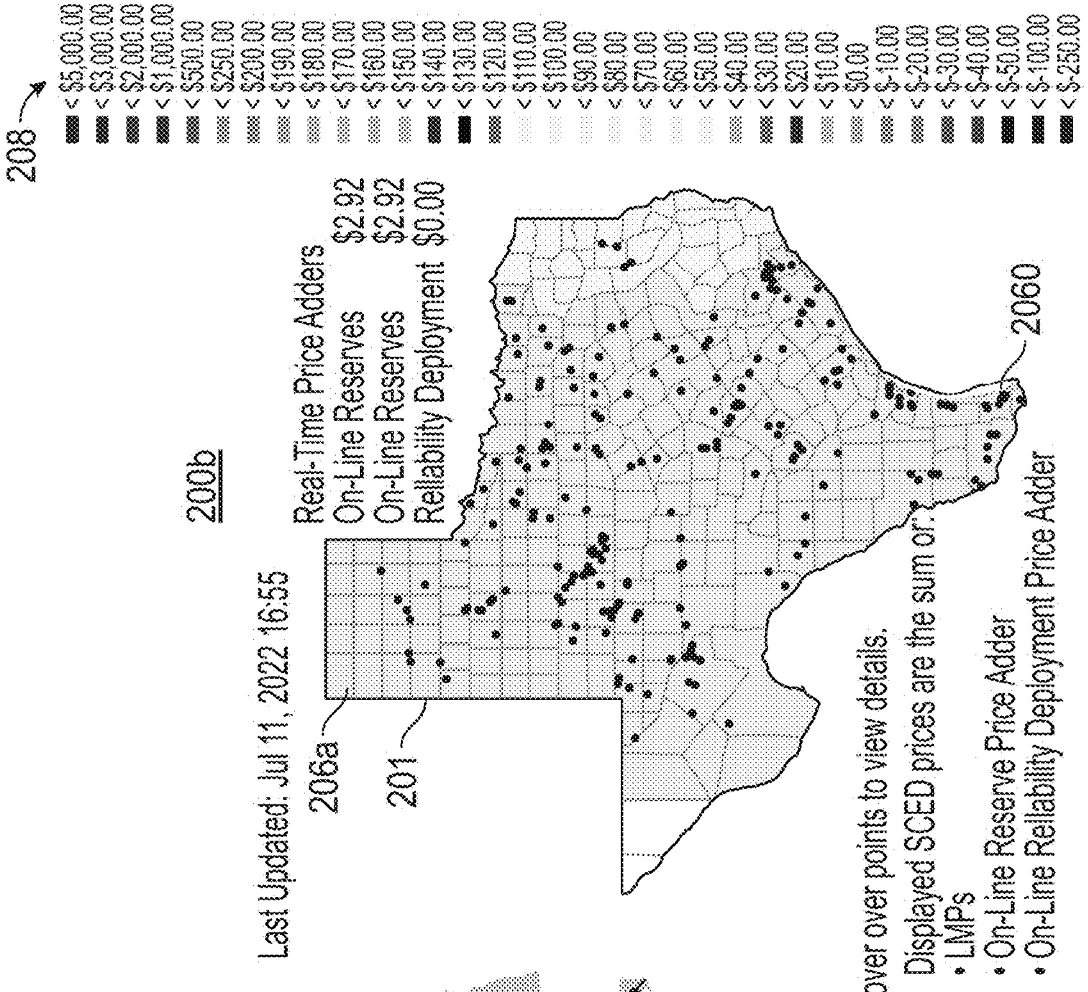
FIGS. 2A and 2B are illustrations of an illustrative electrical power grid operating in a geographic area, in this case Texas, to convey electrical power from electricity producers to customers of an electrical power grid operator and to monitor and adjust pricing of the electrical power being supplied to the electrical power grid.
Figure 2A:
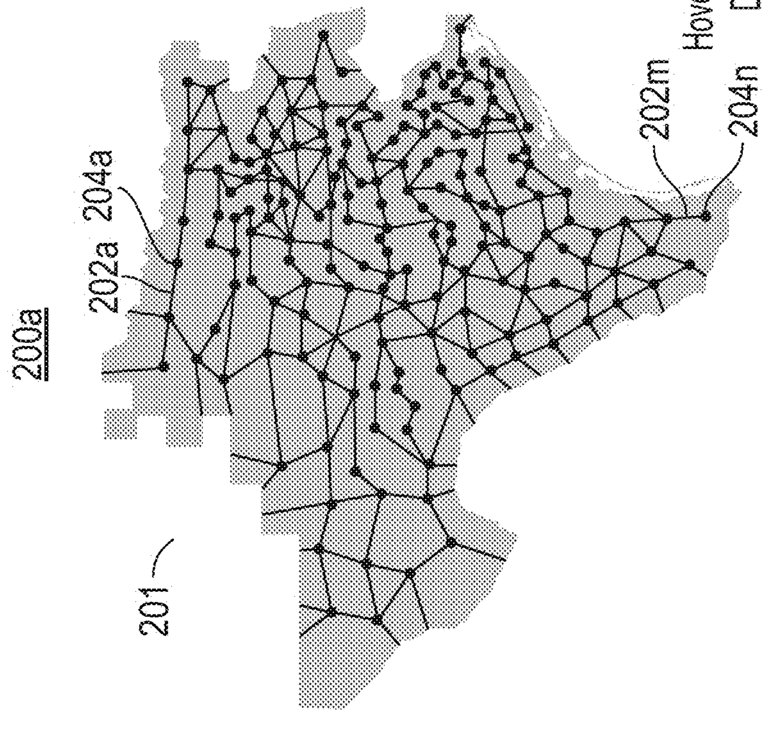

With regard to FIGS. 2A and 2B, illustrations of an illustrative electrical power grid 200*a* operating in a geographic area, in this case the state of Texas 201, to convey electrical power from electricity producers to customers of an electrical power provider and to monitor and adjust pricing of the electrical power being produced and supplied to the electrical power grid 200*a* are shown. The power grid is formed of transmission lines 202*a*-202*m* (collectively 202) and distribution centers 204*a*-204*n* (collectively 204). The power grid 202*a* in Texas 201 operates independent from the Eastern and Western power grids of the United States, but the principles described herein may be applied to the Eastern and Western power grids in the same or similar manner.

With regard to FIG. 2B, the state of Texas 201 is formed of counties 206*a*-206*o* (collectively 206) that may be organized into regions on which different portions of the power grid may be configured to service. The different regions of the power grid may have the same or different pricing as other regions of the power grid as a result of a number of factors, including, but not limited to having different power grid operators, different amounts of local electrical power producers, lower cost power grid service operator(s), and so on. As shown, the different counties 206 and/or regions formed by the counties 206 may have different pricing that may dynamically fluctuate in real-time for a number of reasons, such as varying amount of load, varying amount of electrical power production, especially if renewable energy is varying due to clouds, wind, etc., constantly changing at energy production sites. Energy markets and traders of energy contracts (e.g., futures) may operate on a real-time basis, and when demand increases, electrical power production decreases, cost of electrical production increases, and/or cost of electrical power delivery increases, price of electrical power increases for the electrical power provider to customers increases.

Figure 3A:
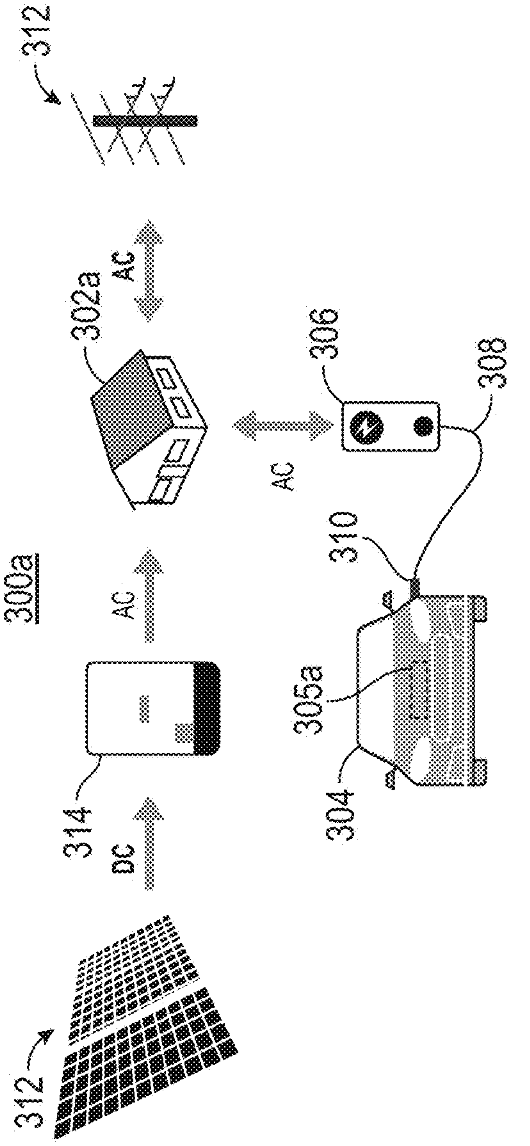
FIGS. 3A and 3B are illustrations of residences with illustrative electrical power storage appliances, including an electrical vehicle (EV) including a rechargeable electrical power source and emergency backup rechargeable electrical power source, that are configured to be remotely controlled to apply stored electrical power onto an electrical power network at the respective residences.
Figure 3B:
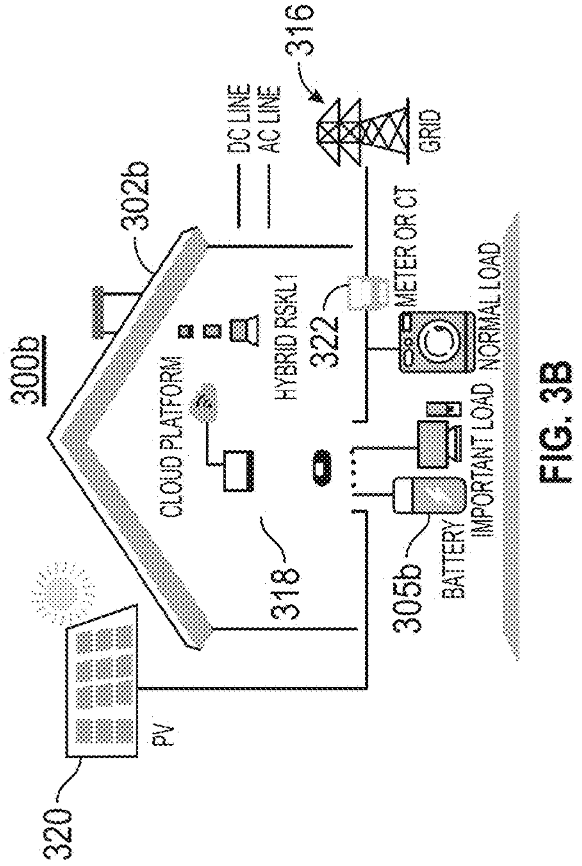

With regard to FIGS. 3A and 3B, illustrations of environments 300*a* and 300*b* including respective residences 302*a* and 302*b* (collectively 302) with illustrative energy storage appliances, including an electrical vehicle (EV) 304 that includes an EV rechargeable battery or energy storage device 305*a* and emergency backup rechargeable battery 305*b* (collectively energy storage appliances 305) are shown. The energy storage appliances 305, if connected to a power source for charging, may be configured to (i) be selectably connected to electrical power networks (e.g., internal wiring of a residence that conducts electricity to home appliances, lights, etc.) of the residences 302, and (ii) supply stored electrical power to the electrical power networks of the respective residences 302.

In the case of the EV rechargeable battery 305*a*, for example, a bidirectional EV charger 306 connected to the electrical power network of the residence 302*a* may be powered via a conductive cable 308 configured with a connector 310 that plugs into a socket of the EV vehicle 304 for charging the EV rechargeable battery 305*a*. The bidirectional EV charger 306 may be locally or remotely selectably set to a charge state or discharge state, where the charge state charges the EV rechargeable battery 305*a* and the discharge state discharges the EV rechargeable battery 305*a*. As the EV rechargeable battery 305*a* discharges, the electrical power becomes an electrical power source or generator to the electrical power network of the residence 302*a*, thereby enabling the residence 302*a* to use less electrical power from a power grid 312 or to be completely offloaded from the power grid 312 if the amount of load of the electrical power network is less than the electrical power being supplied by the EV rechargeable battery 305*a*.

In an embodiment, it is possible to poll or inspect the bidirectional EV charger 306 via a remote communication query to the bidirectional EV charger 306 to determine whether or not the bidirectional EV charger 306 is currently connected to the EV rechargeable battery 305*a* and provide an estimate as to the current charge level of the EV rechargeable battery 305*a*. In another embodiment, it is possible to poll or inspect the EV rechargeable battery 305*a* via a remote communication query or automatic reporting feature from the EV vehicle 304 that may be periodic or aperiodic to determine whether or not the EV vehicle is currently connected to the bidirectional EV charger 306 and provide an estimate as to the current charge level of the EV rechargeable battery 305*a*. The remote inspection or receipt of charging status (e.g., currently plugged in, current charge status, etc.) of the EV rechargeable battery 305*a* may be to a third party provider of an electrical power provider that operates or utilizes the power grid 312. The electrical power provider may be able to access the charging status of the EV rechargeable battery 305*a* information from the third party provider so as to determine whether the residence 302*a* may be able to be offloaded (i.e., the residence 302*a* may be energy "islanded") in real-time (immediate response) or substantially real-time (some delay as a result of network latency and/or periodic updates). The third party provider may be able to access or charging status via a wired and/or wireless communication channel. The residence 302*a* may further include solar panels 312 that connect to a solar inverter 314 to supply electrical power to the residence 302*a*. If solar energy is able to be collected to electrically power the residence 302*a*, then that may further enable the residence 302*a* to further be offloaded from the power grid 312.

In the case of an emergency backup rechargeable battery 305*b* (e.g., wall-mounted battery), the battery 305*b* is typically always connected or connectable to the electrical power network of the residence 302*b* to enable the battery 305*b* to automatically source electrical power to the residence 302*b* in the event of a power outage from a power grid 316. The battery 305*b* may be connected to a junction box 318 that may be used to manage electrical power of the electrical power network of the residence 302*b*. In managing the electrical power, the junction box 318 may be configured to receive or deliver electrical power from and to the grid 316, battery 305*b*, solar panel 320, and so forth. A smart meter 322 may be used to enable an electrical power provider to have real-time or semi-real-time access to electrical power consumption of the residence 302*b*. In an embodiment, the smart meter 322 may be a virtual smart meter. It should be understood that a residence may have one or more electrical storage appliances and that one or more of those electrical storage appliances may be used to offload a residence from a power grid.

Figure 4:
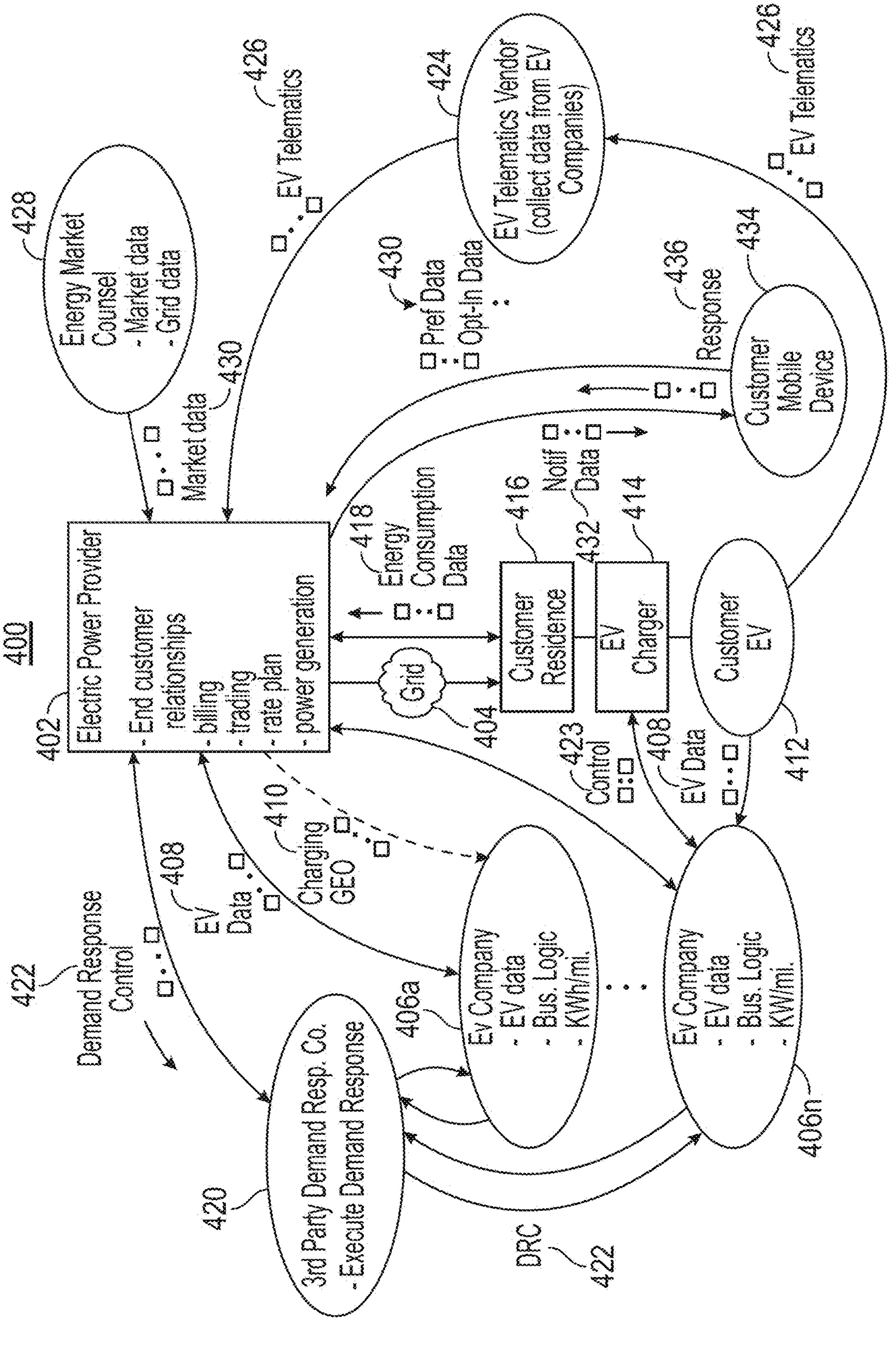
FIG. 4 is a block diagram of an illustrative management and control system used to manage electrical power supply and demand of residences to offload residences from the electrical power grid, thereby reducing demand and price of supply of electricity.

With regard to FIG. 4, a block diagram of an illustrative energy market 400 including an electric power provider 402 that is able to provide for management and control of offloading and onloading customer energy usage by residences and/or businesses from a power grid 404 is shown. The energy power provider 402 may have end-customer relationships, billing responsibilities, energy trading capabilities, customer rate plans, power generation operations, and so on. It should be understood that not all energy power providers have each of the various operations, but do have the end-customer relationships that includes billing responsibilities for electrical energy consumption by the customers. As previously described, because the electrical power provider 402 often has fixed price contracts (e.g., 12 month or 24 month fixed price contracts) with customers, there is a financial incentive for the electrical power provider 402 to maintain profitability of electrical power supplies to the power grid by producing and/or supplying electrical power to customers below the contracted, fixed price prices. As shown, the electric power provider 402 may also perform electricity trading and power generation, so the supplier 402 may use information for hedging commodities that are used to produce electricity, for example.

Electricity generation, if performed by the electrical power provider 402, may also be managed to try and balance supply and demand. Sophisticated systems may be used to predict demand, thereby helping determine supply needs. Because unexpected demand of electricity occurs and supply to meet the demand is not always possible due to baseloads being at or near maximum capacity and renewable energy not having sufficient increase capabilities due to weather (e.g., cloudy or raining) or timing (e.g., nighttime), alternative resources, such as in the form of energy storage appliances (e.g., EV battery, emergency battery rechargeable battery, etc.) at residences, may be utilized to help offload electricity power loads from the power grid 404.

The electric power provider 402 may have direct relationships with customers, which may include monitoring meters or smart meters at the residences along with knowing physical locations or addresses of the residences of the customers. The addresses of the customers may be correlated with portions or branches (e.g., regions) of transmission lines of the power grid 404 such that if a certain portion of the power grid 404 has over-demand of electricity, then the electric power provider 402 may determine that offloading electricity demand from certain customers within that portion of the power grid 404. The electric power provider 402, however, may or may not have knowledge of what energy storage appliances are available at the residences of customers. Even if the electric power provider 402 has knowledge that one or more energy storage appliances are available at a residence of a customer, the electric power provider 402 typically does not have access to real-time data indicative of (i) whether the energy storage appliance(s) are currently plugged in and available to be electrically connected to the electric power network of the residence or (ii) whether the energy storage appliance(s) are sufficiently charged so as to be able (a) to supply sufficient electricity to the residence to support energy needs of the residence for a long enough period of time that an offloading of the residence is useful to the electric power provider 402, and (b) avoid being inconvenient for the customer should he or she wish to use the EV vehicle, for example. Hence, the electric power provider 402 may work with other companies to support a "virtual power plant" concept that utilizes energy storage devices that are operating on the power grid 404 and within certain regions of the power grid 404.

More particularly, the electric power provider 402 may have a relationship with one or more electric vehicle companies 406*a*-406*n* (collectively 406) so that EV vehicle data 408 may be shared with the electric power provider 402 and charging geolocation data (e.g., physical address) 410 may be shared with the EV companies 406. It should be noted that the electric power provider 402 may be able to work with many different EV companies 406 that provide different makes and models of electric vehicles. Similarly, because the energy storage appliances may be in the form of locally positioned rechargeable batteries, sometimes known as wall batteries, a similar arrangement may be established with companies that are able to monitor and/or control operation of a charger that can charge the energy storage appliances or discharge the energy storage appliances to source power to the electric power network of the residence. By sharing the data between the two companies 402 and 406, the electric power provider 402 may be able to learn when a customer EV 412 is electrically connected to an EV charger 414 at a customer residence 416.

The electric power provider 402 may receive energy consumption data or home energy usage data 418 from the customer residence 416, which may allow the electric power provider 402 to determine current electricity load of that residence 416. The electric power provider 402 may use the home energy usage data 418 to determine whether the energy storage appliance or customer EV 412 is sufficient to supply electric power to the customer residence if the customer EV 412 is connected to the EV charger 414. Moreover, the home energy usage data 418 may be shared with the electric vehicle company 406*a* for optionally controlling charge of the customer EV 412 along with other analyses and reporting to the customer. However, because the electric power provider 402 generally does not have access to or control of the EV charger 414 or even definitively know whether or not the customer EV 412 is connected thereto, if the electric power provider 402 wants to offload the energy load of the residence real-time or semi real-time, then the electric power provider 402 has to utilize a non-direct feedback to cause the EV charger 414 to reverse electricity flow from the customer residence 416 and/or grid 404 to the customer EV 412 to be from the customer EV 412 to the EV charger 414 and customer residence 416, thereby allowing the customer residence 416 to become an energy "island" and offloaded from the power grid 404.

In an embodiment, the electric power provider 402 may have a relationship with a third-party demand response company 420 that is configured to execute demand responses in response to the electric power provider 402 communicating a demand response control signal or message 422 that includes customer information, network address of the EV charger 414, physical address, energy storage appliance, information associated with the customer EV 412, EV company 406*n* that has a data and/or control relationship with the customer EV 412 and EV charger 414, and so on. The demand response control 422 may be considered feedback control that enables the electric power provider 402 to control load of the power grid 404. The third-party demand response company 420 may communicate the demand response control message 422 or derivative thereof to the EV company 406*n*, which may communicate a control signal or message 423 to cause the EV charger 414 to switch from supplying electric power to the customer EV 412 to using the rechargeable battery of the customer EV or energy storage appliance to supply electric power to the customer residence 416. In an embodiment, an EV telematics vendor 424 that collects EV telematic data 426 from or for the EV companies 406 may provide the EV telematics data 426 directly to the electric power provider 402 or to the EV company(s) 406 that would then communicate that EV telematics data 426 in the form of EV data 408.

Additionally, the electric power provider 402 may have a relationship with an energy market counsel (e.g., Electric Reliability Council of Texas or ERCOT) 428. The energy market counsel 428 operates to maintain accurate and up-to-date market data 430 that may be supplied to or otherwise made available to the electric power provider 402 for use in determining conditions of the power grid 404. From that data, prediction and other algorithms may be utilized to determine an amount of electrical power that is to be generated to meet demand from loads on the power grid 404. Energy and commodity traders may utilize that information to determine prices, which may then provide information to the electric power provider 402 to determine which customers to offload from the power grid 404 based on location, current energy consumption, or any other factor.

The electric power provider 402 that has a direct relationship the end-customers such that a contractual relationship may be established therebetween. As part of setting up the contractual relationship, if the customer owns or leases an energy storage appliance, then the customers may be allowed to opt-in or opt-out of enabling the electric power provider 402 to offload the respective residences from the power grid 404 under certain conditions.

Customers who opt-in to authorize the electric power provider 402 to offload the residence in whole or in part from the power grid 404 may contract for a known amount of compensation. Customers who do not opt-in to authorize the electric power provider 402 to offload the residence in whole or in part from the power grid 404 may be compensated if respective residences are desired by the electric power provider 402 to offload their respective residences. However, those customers who do not opt-into authorizing the electric power provider 402 to offload the residence from the power grid 404 may have less opportunity to be compensated because the electric power provider 402 may elect to offload residences from the power grid 404 of customers who opted in first and seek further offloading of residences of customers who did not opt-in in the event that insufficient offloading is possible from the opt-in customers. That being said, because the price of generating electricity may be sufficiently high that the electric power provider 402 reaches out to opt-out customers (i.e., non-opt-in customers), the amount of compensation that the electric power provider 402 is willing to offer to the opt-out customers may be higher than the opt-in customers. And, because the electric power provider 402 may be paying higher rates to the opt-out customers, the electric power provider 402 may be incentivized to monitor whether electric storage appliances of opt-in customers become available to stop compensating the opt-out customers, thereby lowering the cost being compensated during a time of high demand or high cost of electrical power.

To support opt-out customers, in an embodiment, the opt-out customers have to provide authorization to the electric power provider 402 before the energy storage appliance may be used to offload the residence from the power grid 404. As such, a network address, such as a mobile telephone number, email address, or any other network address at which the opt-out customer may receive a communication request (see, for example FIG. 6) from the electric power provider 402 to accept or reject authorizing the electric power provider 402 to offload the residence by powering the electric power network of the residence with the energy storage appliance.

As shown, when a customer registers with the electric power provider 402, the customer may supply information 430 (see FIG. 5), such as preference data and opt-in selection(s) to authorize the electric power provider 402 to offload the customer residence 416 from the power grid 404 without further authorization. If the customer is an opt-out customer (i.e., does not opt-in to authorize the electric power provider 402 to offload the customer residence 416), then notification data or message 432 may be communicated to a customer mobile device 434 to temporarily opt-in to authorize the electric power provider 402 to offload the customer residence 416. The customer may submit a response 436 to the notification data 432 to temporarily opt-in or reject temporarily opting in.

In an embodiment, compensation may be offered to the customers who opt-into allowing the electric power provider 402 to offload the residences when offloaded. For example, financial compensation in the form of cash or credit may be provided to the customer based on time, current rate being paid by the customer, current price of energy, current load amount, a guaranteed fixed amount, or based on any other factor. In an embodiment, the electric power provider 402 may offer a $0.02 KWh rebate based on a load that the customer is currently drawing from the power grid 404 and for the amount of time that the customer is offloaded. A wide range of compensation offering may be made to customers as the customers are being onboarded, when the customer acquires an energy storage appliance, when the customer re-contracts with the electric power provider 402, or at any other time.

Figure 5:
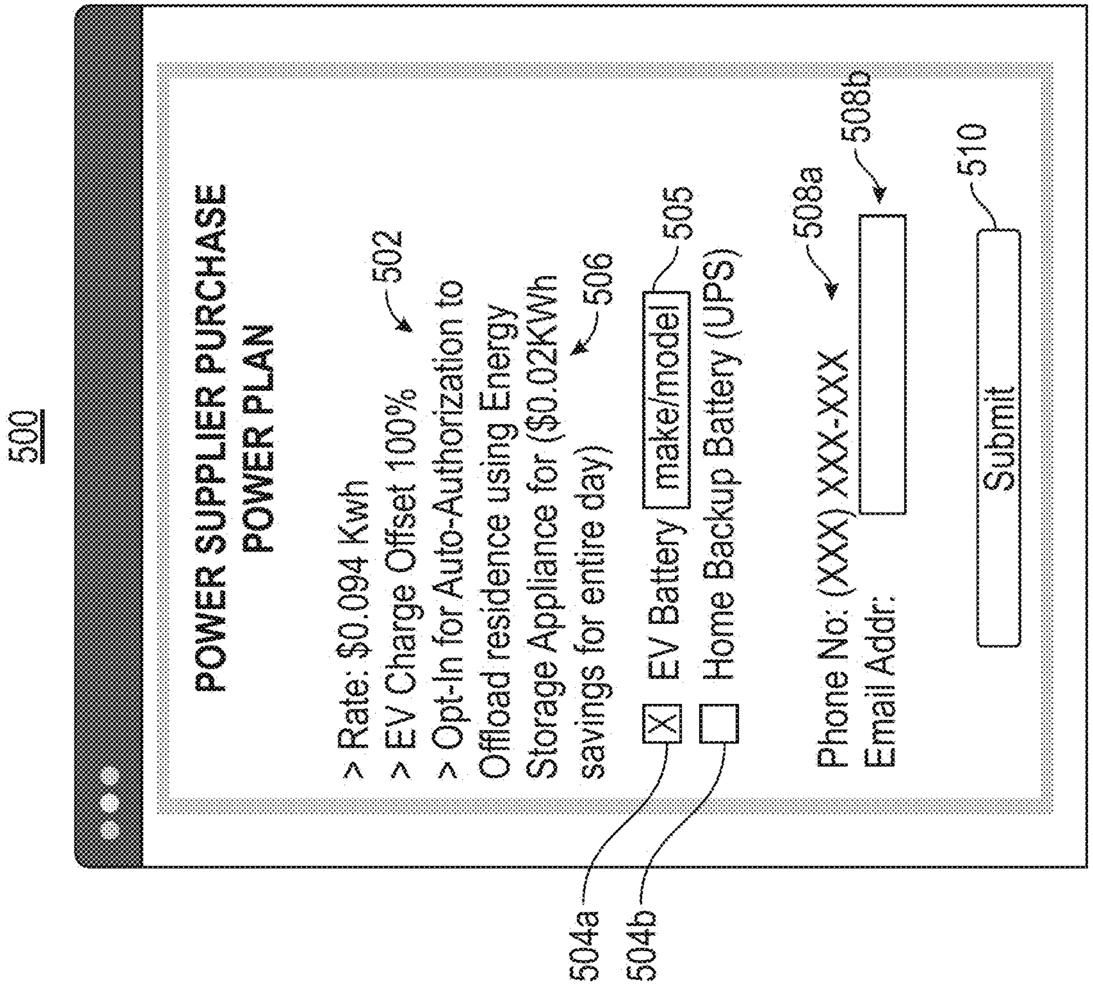
FIG. 5 is a screenshot of an illustrative registration page 500 for contractually becoming a customer of an electricity provider on an electrical power grid, the registration page enabling the customer to opt-in or not opt-in to a program that authorizes the electricity provider to offload a residence of the customer by causing an energy storage appliance to supply power to the electric network.

With regard to FIG. 5, a screenshot of an illustrative registration page 500 for contractually becoming a customer of an electricity provider on an electrical power grid, the registration page enabling the customer to opt-in or not opt-in to a program that authorizes the electricity provider to offload a residence of the customer by causing an energy storage appliance to supply power to the electric network is shown. The registration page 500 may include an offering 502, including an electricity rate of $0.094 KWh, EV charge offset, opt-in compensation 506, energy storage appliance selection boxes 504*a* and 504*b*, make and model entry field 505, phone number entry field 508*a* for text messages or interactive voice response calls, for example, email address entry field 508*b*. Once complete, the user may become a customer by pressing a "submit" button 510 (a "cancel" button" may also be provided). If the user opts in to authorize the electric power provider to offload the residence using an energy storage appliance (e.g., EV battery), then the customer may earn the cash or credit of the electricity power supply contract. The customer may enter a make/model of the EV vehicle, but not opt-in by selecting the energy storage appliance selection box 504*a*, thereby notifying the electric power provider that the customer owns an EV vehicle or EV battery, but chooses not to opt-in, thereby allowing for the electric power provider to communicate with the customer to temporarily opt-in and receive another amount of compensation than that being offered with the opt-in selection. The format of the registration page 500 is illustrative and it should be understood that any other page with additional and/or alternative features may be provided, such as one that includes an opt-out selection element and/or opt-in selection element.

Figure 6:
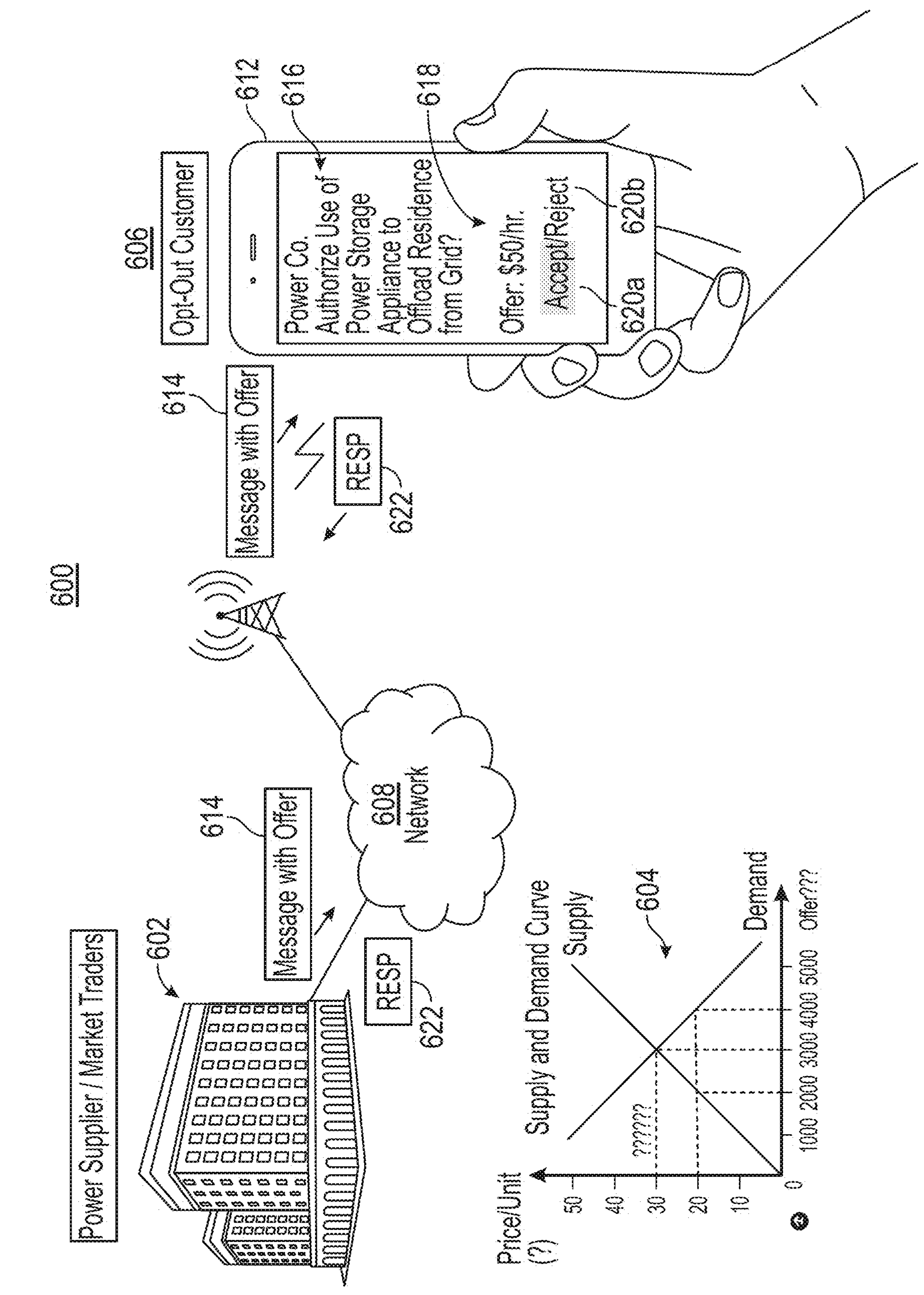
FIG. 6 is an illustration of an illustrative system configured to communicate with non-opt-in customers to request authorization, such as on a temporary basis, along with one or more offers to power respective residences using electrical power storage appliances, thereby offloading the respective residences so as to further reduce load from the electrical power grid.

With regard to FIG. 6, an illustration of an illustrative system 600 configured to communicate with non-opt-in customers to request authorization along with one or more offers to power respective residences using electrical power storage appliances, thereby offloading the respective residences so as to further reduce load from the electrical power grid is shown. As shown, the system 600 may include an electric power provider/market trader 602 that monitors supply and demand of electric power on a power grid. The electric power provider and market trader may determine when demand increases, supply decreases, generation of power prices increase, and so forth, thereby causing the electric power provider to seek to offload energy from a power grid using available energy storage appliances at residences so as to lower electrical energy prices or other commodities used to create electricity, as previously described. In the embodiment of FIG. 6, if the amount of load that the power provider seeks to offload from the power grid is insufficient using the op-in customers, then the electric power provider 602 may seek to offload additional residences from the power grid by opt-out customers who own energy storage appliances.

As shown, an opt-out customer 606 that is accessible via a communications network 608 and mobile network 610 by a mobile device 612 may be sent an electronic message 614 with an offer for the opt-out customer 606 to authorize offloading the residence of the customer from the power grid. The offloading may be a temporary offloading (e.g., based on time, such as 2 hours, or electrical power demand) and provide a certain amount or estimated amount of time to be offloaded. The message 614 with the offer may be sent if the power provider determines that an energy storage appliance of the opt-out customer 606 is connected to an electric power network of a residence of the opt-out customer 606 and the energy storage appliance has sufficient energy available to supply to the residence. In being connected to the electric power network, the energy storage appliance may be connected to the electric power network via an electrical switch or other electrical device that has to be controlled to enable electricity to flow from the energy storage appliance to the electric power network of the residence, where the control of the switch may be remotely controlled (i.e., signal communicated from a device remote from the residence). The information as to whether or not the energy storage appliance is connected to a charger and has sufficient energy storage may be collected directly or indirectly by the power provider, as previously described. The offer of the message 614 may include compensation for authorizing the electric power provider 602 to offload the residence by powering the residence using the energy storage appliance, as previously described.

The mobile device 612 may display text 616 of the electronic message 614 on an electronic display of the mobile device 612. The offer may also be displayed as text 618, and the opt-out customer 606 may select an "accept" 620*a* or "reject" 620*b* button. It should be understood that the message is illustrative, and that other messages and formats may be utilized. In response to the opt-out customer selecting one of the buttons 620*a* or 620*b*, a response message 622 may be communicated back to the electric power provider 602. If the electric power provider 602 receives an "accept" response, then the electric power provider 602 may send a command or message (see FIG. 4) to cause the energy storage appliance to be connected and supply electrical power to the electric power network of the residence so as to offload the energy load of the residence in whole or in part. Once electric energy prices by energy producers have decreased, the electric power provider 602 may communicate another message to directly or indirectly cause the energy storage appliance to be disconnected from or stop supplying electricity to the electric power network of the residence by transitioning an electrical component, such as an electrical switch or charger, thereby bringing the residence back onto the power grid. It should be understood that the messaging process shown in FIG. 6 is unnecessary if a customer is an opt-in customer because an opt-in customer has already authorized the electric power provider to offload the residence from the power grid, as previously described.

Figure 7:
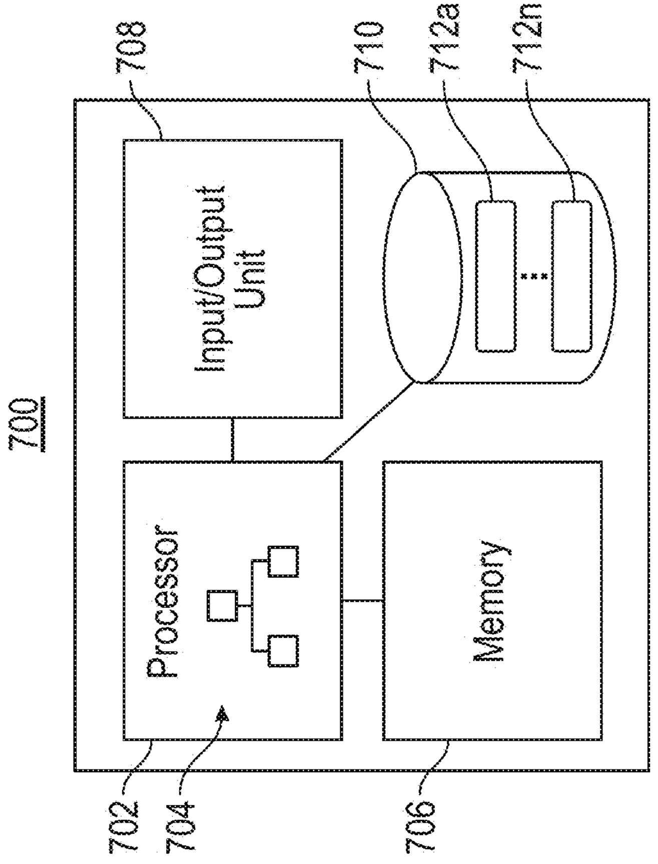
FIG. 7 is an illustration of an illustrative system configured to manage customers and suppliers of electricity of an electrical power grid including adjusting load of the grid by causing electrical storage appliances to be connected to an electrical power network of respective residences.

With regard to FIG. 7, an illustration of an illustrative system 700 configured to manage customers and suppliers of electricity of an electrical power grid including adjusting load of the power grid by causing electrical storage appliances to be connected to an electrical power network of respective residences is shown. The server 700 may include one or more processors 702 that execute software 704. The software 704 may be configured to perform the functions of the electric power provider, as described herein. For example, the software 704 may be configured to register new customers, receive opt-in or opt-out elections by customers, store information of customers having energy storage appliances, and so on, as previously described.

The processor(s) 702 may further be in communication with a non-transitory memory 706 configured to store data and software for use in performing the functions described herein. The processor(s) 702 may further be in communication with an input/output (I/O) unit 708 that may be configured to communicate data over local and/or non-local communications networks. For example, the I/O unit 708 may be configured to communicate data using communications protocols over the Internet, mobile communications networks, or other communications networks. The processor(s) 702 may further be in communication with a storage unit 710 that may store one or more repositories 712*a*-712*n* (collectively 712). The data repositor(ies) 712 may store data associated with customers and business partners (see, for example, FIG. 4) who may be used to support offloading and re-loading residences (i.e., electrical power networks of residences) of customers who currently have energy storage appliances connected to supply electrical power thereto, as described herein. Although the system 700 may be used to support the offloading and re-loading of residences from the power grid by causing energy storage appliances of the customers to supply electrical power to respective electrical power networks, it should be understood that the system alternative functionality, such as monitoring electric energy usage, adjusting invoices of customers based on energy usage and opting-in and/or accepting offers by opt-out customers, and so on. Moreover, the software 704 may interact with energy and/or commodity trading systems so that additional inputs may be fed into an optimization process (e.g., electricity price optimization process), artificial intelligence process, machine learning process, estimation processes, and so on.

As further provided herein, electricity markets may be factored into the management of the load of the power grid(s). An electricity price optimization engine that may operate real-time or non-real-time (e.g., event driven) may be utilized to support the electric power provider, such as electric power provider 402 of FIG. 4, to determine the demand response control 422 or otherwise balance electricity pricing and electricity consumption on the power grid(s) being supported by the electric power provider 402.

Figure 8:
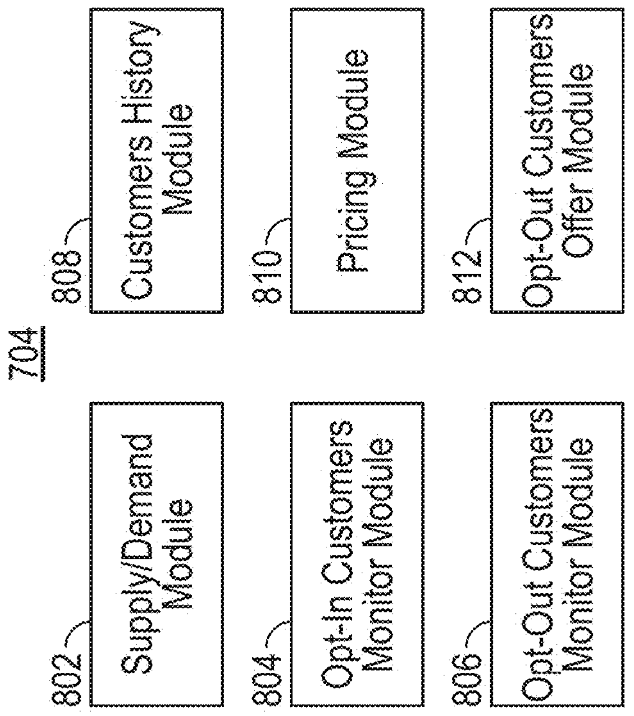
FIG. 8 is a block diagram of illustrative modules configured to perform the functionality of the system of FIG. 7 for an electric power provider.

With regard to FIG. 8, a block diagram of illustrative modules of software 704 configured to perform the functionality of the system of FIG. 7 for an electric power provider is shown. The software 704 may include a set of modules, such as a supply/demand module 802, opt-in customers monitor module 804, opt-out customers monitor module 806, customers history module 808, pricing module 810, and an opt-out customers offer module 812. It should be understood that the modules of the software 704 are illustrative and that additional and/or alternative modules may be utilized to perform the functions described herein. Moreover, it should be understood that additional modules that perform functions that support the functionality described herein may be provided. For example, communications modules, warning notification modules, partner correspondence modules, feedback command modules, and so forth may be more particularly shown, but are understood to be operating with the modules shown.

The supply/demand module 802 may monitor supply and demand on a power grid to create supply/demand curves to assist the electric power provider in monitoring electricity prices. As the electricity prices increase (or decrease) as a result of supply and demand becoming imbalanced (e.g., demand of electricity exceeds supply of electricity), the software 704 may be configured to seek offloading residences and electrical power consumed thereby by using available energy storage appliances owned by opt-in customers and/or opt-out customers.

The opt-in customers monitor module 804 may be configured to monitor when energy storage appliances of the opt-in customers are available to be used to supply electricity to an electric power network of a residence and how much energy is currently available from the appliance. If an energy storage appliance is not available (e.g., not connected to a charging station that allows for discharging onto the electric power network of the residence), then the software 704 does not use the associated residence to offload electric power. Furthermore, if there is insufficient charge of the energy storage appliance (e.g., less than 50% charged), then the system may also not rely on being able to offload that residence. Time that an energy storage appliance has been charging, time of day, history of customer and/or energy storage appliance, and so forth may be utilized in determining whether or not specific energy storage appliances of opt-in customers may be available at any given time or projected in the future (e.g., using the customers history module 808).

The opt-out customers monitor module 806 may be configured to perform the same or similar functions as the opt-in customers monitor module 804. However, as previously described, the opt-out customers may be less often sought for offloading a residence using the energy storage appliances if sufficient offloading of electrical energy from respective residences by the opt-in customers is possible.

The customers history module 808 may be configured to monitor history of customers, either or both of the opt-in and opt-out customers. The history of the customers may be useful to the electric power provider so as they have projections as to how much available energy offloading is possible throughout a day, week, or month, for example. In other words, projections may be made based on history of customers as to available energy storage by energy storage appliances of each of the customers that have the energy storage appliances. For opt-out customers, history may be made for whether or not those customers are willing to authorize offloading of the residences or not, and if so, the offers or compensation that the opt-out customers have previously accepted. The history may include specific amounts of compensation, average compensation, or any other information that may be relevant and utilized to make offers to the opt-out customers to authorize offloading residences.

The pricing module 810 may be configured to estimate or determine energy prices that currently exist for electrical energy to be supplied to the power grid. The pricing module 810 may be used to track actual prices from energy producers as well as project energy prices by offloading certain numbers of residences or amounts of energy from residences by using energy storage appliances of the customers. In an embodiment, the pricing module 810 may use artificial intelligence or any other mathematical and/or logical tools in performing projections of electrical power that may result from offloading residences.

The opt-out customers offer module 812 may be configured to determine offers to be made to opt-out customers in the event that insufficient amount of energy is available to be offset from the opt-in customers. The offer module 812 may use artificial intelligence or other projection tools based on the pricing module 810, customer history module 808, or any other information that may be helpful to set compensation for the opt-out customers to authorize the electric power provider to offload residences of the opt-out customers temporarily (e.g., from a few minutes to a few hours).

Figure 9:
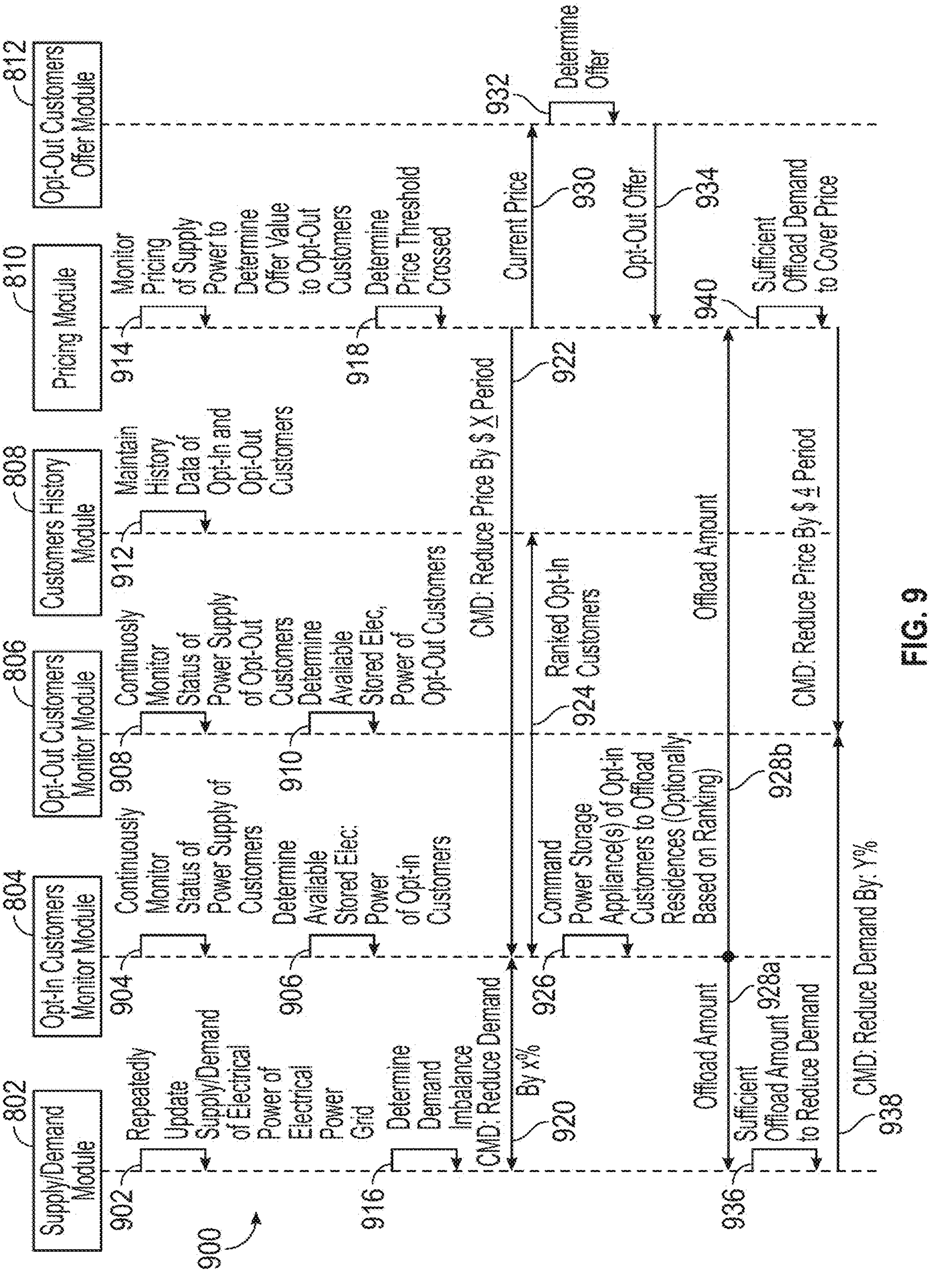
FIG. 9 is an interactive diagram including the modules and illustrative processing and communications thereof.

With regard to FIG. 9, an interactive diagram including the modules 802-812 of FIG. 8 and illustrative processing 900 and communications thereof is shown. The interactive diagram provides basic processing by the modules 802-812 and interactions therebetween so as to perform the functionality described herein. As previously described, modules 802-812 may be used to monitor pricing of electricity from electricity producers (e.g., traditional and renewable electricity), monitor supply and demand, monitor opt-in and opt-out customers, and use the other various information to try and maintain a stable and properly priced electricity to provide customers of an electric power provider.

In particular, the process 900 may start at step 902, where the supply/demand module 802 may be configured to repeatedly update supply/demand of electrical power of an electrical power grid. In repeatedly updating supply and demand, the module 802 may be configured to continuously, periodically, or aperiodically update supply and demand of electrical power of the electrical power grid. To update supply and demand of electrical power, measurements from equipment of or in electrical communication with the grid may be utilized. For example, an electrical power plant, in any form, that is supplying electrical power to the grid may be configured to monitor an amount of electrical power being supplied to the grid may provide such electrical supply data to the system. For example, electrical power monitoring devices may be utilized, and the supply and demand data may be updated in a central or distributed data repository. More specifically, inverters, converters, or any other electrical equipment that receive electrical power from electrical energy production devices, such as gas or wind driven turbines, solar panels, or otherwise (e.g., nuclear reactors) may track the amount of electrical power being transferred onto the power grid and communicate that data directly or indirectly to the supply/demand module 802 (or another module).

The opt-in customers monitor module 804 may be configured to continuously monitor status of power supply of opt-in customers at step 904. As previously described, the opt-in customers may be obligated to enable the electric power provider to offload residences of the opt-in customers in times of heavy electrical power demand, low electrical power supply, or combination thereof. The monitoring may include determining that one or more energy storage appliances of each of the opt-in customers (i) are electrically connected to electrical power grids of the respective residences, and (ii) have sufficient charge to supply sufficient electrical power to the residences (e.g., sufficient to supply at least 60 minutes of electrical power). It should be understood that the opt-in customers monitor module 804 may update periodically or aperiodically, which for the purposes of this process, may be considered to be continuous updates.

At step 906, the opt-in customers monitor module 804 may further be configured to determine available stored electrical power of opt-in customers. The stored electrical power may be a rechargeable battery or be in the form of potential mechanical energy that may be converted to electrical power if the generator is a mechanical system, such as a flywheel or other energy storage system, that is configured to output electric power using electromagnetics or otherwise. The available stored electrical power of the opt-in customers may enable the system to know how much electrical power is readily available to be offloaded based on an amount of load currently on the grid by the residences, which may also be determined and collected by smart meters or otherwise at the respective residences. As previously described, the amount of available stored electrical power may be used for offloading in the event that the amount of stored electrical power of the opt-in customers satisfy supply/demand curves to reduce pricing of electrical power for the electric power provider. If the amount of available stored electrical power is not sufficient, available stored electrical power of opt-out customers may be determined, as further described herein.

At step 908, the opt-out customers monitor module 806 may be configured to continuously monitor status of energy storage appliances or power supplies of the opt-out customers. By monitoring the energy storage appliance of the opt-out customers, the system may be able to identify opt-out customers who have energy storage appliances that (i) are electrically connected to electrical power grids of the respective residences, and (ii) have sufficient charge to supply sufficient electrical power to the residences (e.g., sufficient to supply at least 60 minutes of electrical power). It should be understood that the opt-out customers monitor module 806 may update periodically or aperiodically, which for the purposes of this process, may be considered to be continuous updates.

At step 910, the opt-out customers monitor module 806 may be configured to determine available stored electrical power of the opt-out customers. The available stored electrical power of the opt-out customers may enable the system to know how much electrical power is readily available to be offloaded based on an amount of load currently on the grid by the residences, which may also be determined and collected by smart meters or otherwise at the respective residences. As previously described, the amount of available stored electrical power may be used for offloading in the event that the amount of stored electrical power of the opt-in customers is insufficient to satisfy supply/demand curves to reduce pricing of electrical power for the electric power provider. As part of determining available power, communications including offers to the opt-out customers, as previously described, may be made because simply knowing that stored electrical power exists is insufficient without an agreement (e.g., via electronic messaging with an offer for an opt-in acceptance as previously described) with the opt-out customers allowing for offloading the respective residences. In response to a confirmation from the opt-out customers, the opt-out customers monitor module 806 (or anther module) may count that stored electrical power as being available. Another module, such as the opt-out customers offer module 812, may be utilized to ensure proper compensation for the opt-out customers who opt-in, at least temporarily.

At step 912, the customers history module 808 may be configured to maintain history data of opt-in and opt-out customers. The history data may include a wide range of information, such as (i) times that the stored electrical power of an energy storage appliance (e.g., electric vehicle) is available (e.g., electrically connected to a charger at a residence and suitably charged) for opt-in customers, (ii) whether an opt-in customer is typically at the residence during peak demand times, (iii) willingness of opt-out customers to temporarily opt-in, (iv) typical minimum offer (e.g., cash, credit, etc.) for each of the opt-out customers to accept to opt-in during peak demand times, (v) times that the stored electrical power of an energy storage appliance (e.g., electric vehicle) are available from opt-out customers, etc. The electric power provider may use the history data to know what electrical power reserves may or may not be available for supply/demand considerations. In an embodiment, artificial intelligence and/or machine learning may be used to identify patterns of the opt-in and opt-out customers along with their respective energy storage appliances to allow for better modeling (e.g., to better define reliability of each customer).

At step 914, the pricing module 810 may be configured to monitor pricing of supply power to determine offer value to opt-out customers. The pricing module 810 may use the history data along with any other real-time data in determining offer value. For example, the offer value may be different for each opt-out customer based on historical data collected by the customers history module 808.

At step 916, the supply/demand module 802 may be configured to determine a demand imbalance relative to supply. Such a demand imbalance indicating that demand is higher than supply may be indicative that price of energy is increasing or going to increase in a manner that may cause the price to supply electrical power to the customers will be higher than fixed price contracts. Additionally, if the supply becomes significantly higher than demand, the price of energy may drop too low, especially if the electrical power supplier is also an electrical power generator and/or energy trader.

At step 918, the pricing module 810 may further be configured to determine whether a price threshold is crossed. The price threshold may be associated or correlated with average pricing of electricity supply contracts to the customers. Alternative thresholds may be utilized in determining the price threshold. For example, the price threshold may be a price threshold for energy production or acquisition as opposed to supply to customers via the power grid.

The supply/demand module 802 may further be configured to generate and send a command to the op-in customers monitor module 804 to reduce demand by X % as a function of the demand imbalance at step 920. It should be understood that a module or sub-module other than the supply/demand module 802 may be configured to determine the X % by utilizing the supply/demand update information by the supply/demand module 802. The command at step 920 may be communicated to the opt-in customers monitor module 804 or any other module configured to perform the same or similar functions as described herein below. As an example, historical information may provide the supply/demand module 802 with a number of customers and/or amount of energy needed to cause a certain percent change (e.g., X %) in demand, and the command may be generated utilizing that historical information. The command may notify the opt-in customers monitor module 804 to reduce demand by X %, which causes the opt-in customers monitor module 804 to automatically cause a reduction in demand by X %.

The pricing module 810 may further be configured to generate a command to reduce price by $X per kilowatt. In determining the command, the pricing model 810 may utilize information and/or generated by the pricing module 810. As with the module 802, the pricing module 810 may send the command to the opt-in customers monitor module 804 at step 922 to reduce price by $X per kilowatt.

At step 924, the opt-in customers monitor module 804 and customers history module 808 may be in communication with one another to determine ranking of opt-in customers in order to determine which customers to offload from the grid. The ranking of opt-in customers may be performed by the customers history module 808 on a continuous basis based on a number of factors, such as time of day, baseline usage of electrical power, typical availability of energy storage appliances, or otherwise, thereby enabling the opt-in customers monitor module 804 to command power storage appliances of opt-customers to offload residences (optionally based on ranking of the opt-in customers) at step 926. In other words, the opt-customers monitor module 804 may be configured to automatically control energy storage appliances of the opt-in customers to achieve the commanded objectives of demand reduction and/or price reduction desire to meet the goals of the electric power provider.

The opt-in customers monitor module 804 may thereafter communicate offload amounts at step 928 to the supply/demand module 802 and pricing module 810 to enable each of the modules 802 and 810 to determine changes occurring by the opt-in customers so as to update mathematical models of the supply/demand module 802 and pricing module 810.

The pricing module 810 may further be configured to communicate current price the opt-out customers offer module 812 at step 930. The opt-out customers offer module 812 may determine an offer for the opt-out customers at step 932. The offer may be cash, credit, or otherwise. In an embodiment, the offer may be the same for each of the opt-out customers. Alternatively, the offer to the opt-out customers may be different based on history of each of the different opt-out customers. For example, some opt-out customers may wait until a certain price that is significantly higher than other opt-out customers. At step 934, the opt-out customers offer module 812 may communicate an opt-out offer to the pricing module 810, which may utilize the offer amounts as part of pricing to the opt-out customers.

At step 936, the supply/demand module 802 may determine if a sufficient offload amount to reduce demand has been achieved. In other words, based on the number of opt-in customers that have been offloaded in the amount of electrical power that the offloading of the opt-customers represents, the supply/demand module 802 may determine if X % has been achieved or less than or more than X % has been achieved by offloading the number of opt-in customers possible. If not, the supply/demand module 802 may communicate a command to the opt-out customers monitor module 806 to reduce demand by Y % to further reduce demand on the electric grid at step 938. The pricing module 810 may also determine if sufficient offload amount to lower price has been achieved at step 940. If not, the pricing module 810 may be configured to communicate a command to the opt-out customers monitor module 806 to reduce price by $Y per kilowatt. The opt-out customers monitor module 806 may further be configured to offload any opt-out customers who have agreed to opt out, as previously described. It should be understood that the process 900 of FIG. 9 is illustrative and that additional and/or alternative processes may be utilized to perform the same or similar functionality to manage offloading and onloading of residences (and businesses) of opt-in and opt-out customers to enable an electric power provider to manage supply and demand of a power grid so as to better regulate and manage pricing of electricity being produced, purchased, and distributed to customers.

Features

One embodiment of a system for managing an electric power grid may include a non-transitory memory configured to store: (i) a first list of first customers and respective energy storage appliances configured to store energy to produce electrical power to be delivered to respective electrical power networks of residences of the first customers when electrically connected thereto, the first customers opting in to authorize an electric power provider to establish an electrical connection of the respective energy storage appliances to the respective electrical power network of the residences of the first customers in response to a command by the electric power provider; (ii) a second list of second customers and respective energy storage appliances configured to store energy to produce electrical power to be delivered to respective electrical power networks of residences of the second customers when electrically connected thereto, the second customers not opting into authorizing an electric power provider to establish an electrical connection of the respective energy storage appliances to the respective electrical power networks of the residences of the second customers in response to a command by the electrical power provider for the residences of the second customers, the second list further including network addresses of communications devices of the respective second customers. At least one processor may be in communication with the non-transitory memory, and be configured to monitor connection and charge status of energy storage appliances of the first and second customers. An amount of electrical power to be offloaded from the grid to reduce energy load by a desired amount may be determined. In response to determining the amount of electrical power to offload from the grid, a determination of a set of energy storage appliances that are (i) currently connected to the electrical power networks of respective residences of the first customers and (ii) charged sufficiently to offload the respective residences from the grid may be made. Determining that the energy storage appliances are charged sufficiently to offload a residence may include determining that the energy storage appliances are above a threshold charge (e.g., over 50% charged, enough charge to power a residence for at least 1 hour optionally based on current or historical power consumption, or otherwise). A determination as to whether the set of energy storage appliances is sufficient to reduce the energy load from the grid by the desired amount may be performed. In response to determining that the set of energy storage appliances is insufficient to reduce the energy load from the grid by the desired amount, requests may be communicated to the network addresses of communications devices of the second customers to request authorization to offload the respective residences by using energy storage appliances connected thereto to power the residences. In response to receiving authorization from the second customers, at least a portion of the energy storage appliances of the first and second customers may be commanded to supply electrical power to the respective residences of the first and second customers, thereby reducing the energy load on the electrical grid by the desired amount. In commanding the at least a portion of the energy storage appliances, commands may be sent to chargers to which the respective energy storage appliances are connected so as to reverse the chargers from charging the energy storage appliances to sourcing electric power from the energy storage appliances.

In one embodiment, processor(s) may further be configured to determine that electrical power on the grid on which at least a portion of the residences of the first and second customers are electrically connected has exceeded a threshold price, and in response thereto, initiate offloading residences from the power grid by commanding energy storage appliances of customers to power respective residences. The command may be communicated to a third-party that controls a charger to which the energy storage appliance is connected. The command may cause a system of the third-party to initiate controlling the charger to cause the energy storage appliance to supply electrical power to the electric power network of the residence.

In one embodiment, the energy storage appliance is an electric vehicle including a rechargeable battery. The energy storage appliance may be a rechargeable battery mounted to a wall that is supplied power by a solar panel.

The processor(s) may further be configured to continuously monitor status of respective energy storage appliances of the opt-in customers and opt-out customers. The processor(s) may further be configured to repeatedly determine electricity demand on the grid and repeat offloading residences of additional first and second customers until reduction of the energy load on the electrical grid reaches the desired amount.

The processor(s) may further configured to determine an offer value for the second customers to authorize offload respective residences from the grid, and where the requests communicated to the second customers include the offer value. The processor(s), in determining an offer value, may further be configured to determine an offer value for the second customers based in part on historical information of each of the second customers such that the offer value is tailored for each of the second customers.

One embodiment of a method for managing an electric power grid may include storing (i) a first list of first customers and respective energy storage appliances configured to store energy to produce electrical power to be delivered to respective electrical power networks of residences of the first customers when electrically connected thereto, the first customers opting in to authorize an electric power provider to establish an electrical connection of the respective energy storage appliances to the respective electrical power network of the residences of the first customers in response to a command by the electric power provider; and (ii) a second list of second customers and respective energy storage appliances configured to store energy to produce electrical power to be delivered to respective electrical power networks of residences of the second customers when electrically connected thereto, the second customers not opting into authorizing an electric power provider to establish an electrical connection of the respective energy storage appliances to the respective electrical power networks of the residences of the second customers in response to a command by the electrical power provider for the residences of the second customers, the second list further including network addresses of communications devices of the respective second customers. Connection and charge status of energy storage appliances of the first and second customers may be monitored. An amount of electrical power to be offloaded from the grid to reduce energy load by a desired amount may be determined. In response to determining the amount of electrical power to offload from the grid, a determination of a set of energy storage appliances that are (i) currently connected to the electrical power networks of respective residences of the first customers and (ii) charged sufficiently to offload the respective residences from the grid may be made. A determination as to whether the set of energy storage appliances is sufficient to reduce the energy load from the grid by the desired amount may be determined. In response to determining that the set of energy storage appliances is insufficient to reduce the energy load from the grid by the desired amount, requests may be communicated to the network addresses of communications devices of the second customers to request authorization to offload the respective residences by using energy storage appliances connected thereto to power the residences. In response to receiving authorization from the second customers, commands to at least a portion of the energy storage appliances of the first and second customers may be made to supply electrical power to the respective residences of the first and second customers, thereby reducing the energy load on the electrical grid by the desired amount.

A determination that electrical power on the grid on which at least a portion of the residences of the first and second customers are electrically connected has exceeded a threshold price may be made, and in response thereto, energy storage appliances of customers may be commanded to power respective residences to initiate offloading residences from the power grid. Commanding energy storage appliances may include communicating the command to a third-party that controls a charger to which the energy storage appliance is connected. Commanding may cause a system of the third-party to initiate controlling the charger to cause the energy storage appliance to supply electrical power to the electric power network of the residence.

Commanding at least a portion of the energy storage appliances of the first and second customers may include commanding at least a portion of chargers of an electric vehicle including a rechargeable battery. Commanding at least a portion of the energy storage appliances of the first and second customers may include commanding a switch of rechargeable batteries mounted to walls, the rechargeable batteries being supplied power by respective solar panels.

The process may further include continuously monitoring status of respective energy storage appliances of the opt-in customers and opt-out customers. Electricity demand on the grid may be repeatedly determined, and residences of additional first and second customers may be repeatedly offloaded until reduction of the energy load on the electrical grid reaches the desired amount.

An offer value for the second customers to authorize offload respective residences from the grid may be determined, and the requests to the second customers includes communicating the requests with the offer value may be communicated. Determining an offer value may include determining an offer value for the second customers based in part on historical information of each of the second customers such that the offer value is tailored for each of the second customers.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

The previous description is of various preferred embodiments for implementing the disclosure, and the scope of the invention should not necessarily be limited by this description. The scope of the present invention is instead defined by the claims.

What is claimed:

1. A system for managing an electric power grid, said system comprising:

a non-transitory memory configured to store:

(i) a first list of first customers and respective energy storage appliances configured to store energy to produce electrical power to be delivered to respective electrical power networks of residences of the first customers when electrically connected thereto, the first customers opting in to authorize an electric power provider to establish an electrical connection of the respective energy storage appliances to the respective electrical power network of the residences of the first customers in response to a command by the electric power provider; and (ii) a second list of second customers and respective energy storage appliances configured to store energy to produce electrical power to be delivered to respective electrical power networks of residences of the second customers when electrically connected thereto, the second customers not opting into authorizing an electric power provider to establish an electrical connection of the respective energy storage appliances to the respective electrical power networks of the residences of the second customers in response to a command by the electrical power provider for the residences of the second customers, the second list further including network addresses of communications devices of the respective second customers;

at least one processor in communication with the non-transitory memory, and configured to:

monitor connection and charge status of energy storage appliances of the first and second customers;

determine an amount of electrical power to be offloaded from the grid to reduce energy load by a desired amount;

in response to determining the amount of electrical power to offload from the grid, determine a set of energy storage appliances that are (i) currently connected to the electrical power networks of respective residences of the first customers and (ii) charged sufficiently to offload the respective residences from the grid;

determine whether the set of energy storage appliances is sufficient to reduce the energy load from the grid by the desired amount;

in response to determining that the set of energy storage appliances is insufficient to reduce the energy load from the grid by the desired amount, communicate requests to the network addresses of communications devices of the second customers to request authorization to offload the respective residences by using energy storage appliances connected thereto to power the residences; and in response to receiving authorization from the second customers, command at least a portion of the energy storage appliances of the first and second customers to supply electrical power to the respective residences of the first and second customers, thereby reducing the energy load on the electrical grid by the desired amount.

2. The system according to claim 1, wherein the at least one processor is further configured to determine that electrical power on the grid on which at least a portion of the residences of the first and second customers are electrically connected has exceeded a threshold price, and in response thereto, initiate offloading residences from the power grid by commanding energy storage appliances of customers to power respective residences.

3. The system according to claim 1, wherein the command is communicated to a third-party that controls a charger to which the energy storage appliance is connected.

4. The system according to claim 3, wherein the command causes a system of the third-party to initiate controlling the charger to cause the energy storage appliance to supply electrical power to the electric power network of the residence.

5. The system according to claim 1, wherein the energy storage appliance is an electric vehicle including a rechargeable battery.

6. The system according to claim 1, wherein the energy storage appliance is a rechargeable battery mounted to a wall that is supplied power by a solar panel.

7. The system according to claim 1, wherein the at least one processor is further configured to continuously monitor status of respective energy storage appliances of the opt-in customers and opt-out customers.

8. The system according to claim 1, wherein the at least one processor is further configured to repeatedly determine electricity demand on the grid and repeat offloading residences of additional first and second customers until reduction of the energy load on the electrical grid reaches the desired amount.

9. The system according to claim 1, wherein the at least one processor is further configured to:

determine an offer value for the second customers to authorize offload respective residences from the grid; and wherein the requests communicated to the second customers include the offer value.

10. The system according to claim 9, wherein the at least one processor, in determining an offer value, is further configured to determine an offer value for the second customers based in part on historical information of each of the second customers such that the offer value is tailored for each of the second customers.

11. A method for managing an electric power grid, said method comprising:

storing:

(i) a first list of first customers and respective energy storage appliances configured to store energy to produce electrical power to be delivered to respective electrical power networks of residences of the first customers when electrically connected thereto, the first customers opting in to authorize an electric power provider to establish an electrical connection of the respective energy storage appliances to the respective electrical power network of the residences of the first customers in response to a command by the electric power provider;

(ii) a second list of second customers and respective energy storage appliances configured to store energy to produce electrical power to be delivered to respective electrical power networks of residences of the second customers when electrically connected thereto, the second customers not opting into authorizing an electric power provider to establish an electrical connection of the respective energy storage appliances to the respective electrical power networks of the residences of the second customers in response to a command by the electrical power provider for the residences of the second customers, the second list further including network addresses of communications devices of the respective second customers;

monitoring connection and charge status of energy storage appliances of the first and second customers;

determining an amount of electrical power to be offloaded from the grid to reduce energy load by a desired amount;

in response to determining the amount of electrical power to offload from the grid, determining a set of energy storage appliances that are (i) currently connected to the electrical power networks of respective residences of the first customers and (ii) charged sufficiently to offload the respective residences from the grid;

determining whether the set of energy storage appliances is sufficient to reduce the energy load from the grid by the desired amount;

in response to determining that the set of energy storage appliances is insufficient to reduce the energy load from the grid by the desired amount, communicating requests to the network addresses of communications devices of the second customers to request authorization to offload the respective residences by using energy storage appliances connected thereto to power the residences; and in response to receiving authorization from the second customers, commanding at least a portion of the energy storage appliances of the first and second customers to supply electrical power to the respective residences of the first and second customers, thereby reducing the energy load on the electrical grid by the desired amount.

12. The method according to claim 11, further comprising determining that electrical power on the grid on which at least a portion of the residences of the first and second customers are electrically connected has exceeded a threshold price, and in response thereto, commanding energy storage appliances of customers to power respective residences to initiate offloading residences from the power grid.

13. The method according to claim 11, wherein commanding energy storage appliances includes communicating the command to a third-party that controls a charger to which the energy storage appliance is connected.

14. The method according to claim 13, wherein commanding causes a system of the third-party to initiate controlling the charger to cause the energy storage appliance to supply electrical power to the electric power network of the residence.

15. The method according to claim 11, wherein commanding at least a portion of the energy storage appliances of the first and second customers includes commanding at least a portion of chargers of an electric vehicle including a rechargeable battery.

16. The method according to claim 11, wherein commanding at least a portion of the energy storage appliances of the first and second customers includes commanding a switch of rechargeable batteries mounted to walls, the rechargeable batteries being supplied power by respective solar panels.

17. The method according to claim 11, further comprising continuously monitoring status of respective energy storage appliances of the opt-in customers and opt-out customers.

18. The method according to claim 11, further comprising repeatedly determining electricity demand on the grid and repeat offloading residences of additional first and second customers until reduction of the energy load on the electrical grid reaches the desired amount.

19. The method according to claim 11, further comprising:

determining an offer value for the second customers to authorize offload respective residences from the grid; and wherein communicating the requests to the second customers includes communicating the requests with the offer value.

20. The method according to claim 19, wherein determining an offer value includes determining an offer value for the second customers based in part on historical information of each of the second customers such that the offer value is tailored for each of the second customers.

* * * * *